United States Patent
Kato et al.

(10) Patent No.: US 9,182,499 B2
(45) Date of Patent: Nov. 10, 2015

(54) INSPECTION DEVICE OF RADIOACTIVE WASTE BODY AND INSPECTION METHOD OF RADIOACTIVE WASTE BODY

(71) Applicant: Kabushiki Kaisha Toshiba, Minato-ku (JP)

(72) Inventors: Yasuhiro Kato, Fuchu (JP); Masashi Aoki, Saitama (JP); Yusuke Tsuboi, Chofu (JP)

(73) Assignee: KABUSHIKI KAISHA TOSHIBA, Minato-ku (JP)

( * ) Notice: Subject to any disclaimer, the term of this patent is extended or adjusted under 35 U.S.C. 154(b) by 0 days.

(21) Appl. No.: 14/311,596

(22) Filed: Jun. 23, 2014

(65) Prior Publication Data

US 2014/0374595 A1  Dec. 25, 2014

(30) Foreign Application Priority Data

Jun. 24, 2013  (JP) .................. 2013-131941

(51) Int. Cl.
*G01T 1/02* (2006.01)
*G01T 1/167* (2006.01)

(52) U.S. Cl.
CPC .. *G01T 1/02* (2013.01); *G01T 1/167* (2013.01)

(58) Field of Classification Search
CPC .................... G01T 1/00; G01T 1/02
USPC ....................................... 250/336.1
See application file for complete search history.

(56) References Cited

U.S. PATENT DOCUMENTS 8,747,624 B2 *  6/2014  Medoff ............... 204/157.63
2006/0065832 A1 *  3/2006  Orr .......................... 250/336.1

FOREIGN PATENT DOCUMENTS

| JP | 62184383 A | * 8/1987 |
| JP | 05-072342 A | 3/1993 |
| JP | 6-308245 | 11/1994 |
| JP | 11-326522 | 11/1999 |
| WO | WO 00/42447 A1 | 7/2000 |

OTHER PUBLICATIONS

Extended European Search Report issued Nov. 5, 2014 in Patent Application No. 14173451.7.

* cited by examiner

*Primary Examiner* — David Porta
*Assistant Examiner* — Faye Boosalis
(74) *Attorney, Agent, or Firm* — Oblon, McClelland, Maier & Neustadt, L.L.P.

(57) ABSTRACT

A radioactive waste body inspection device according to an embodiment includes a surface contamination inspecting unit configured to conduct a surface contamination inspection of a radioactive waste body while acquiring concavo-convex information on the radioactive waste body, and a dose rate inspecting unit configured to conduct a dose rate inspection of the radioactive waste body in consideration of the concavo-convex information.

12 Claims, 11 Drawing Sheets

INSPECTION DEVICE OF RADIOACTIVE WASTE BODY AND INSPECTION METHOD OF RADIOACTIVE WASTE BODY

CROSS-REFERENCE TO RELATED APPLICATIONS

This application is based upon and claims the benefit of priority from Japanese Patent Application No. 2013-131941, filed Jun. 24, 2013; the entire contents of which are incorporated herein by reference.

FIELD

Embodiments described herein relate generally to an inspection device of a radioactive waste body and an inspection method of the radioactive waste body.

BACKGROUND

Generally, before a radioactive waste body is housed and transported, it is necessary to conduct a surface contamination inspection or dose rate inspection of the radioactive waste body and confirm whether the state of the waste body is within a predetermined standard. These inspections are often conducted in independent procedures and devices. For example, the surface contamination inspection of the radioactive waste is conducted using a surface contamination inspection device (which is also called a "wiping device" or a "smear device"), and, afterward, the dose rate inspection is conducted using a surface rate inspection device different from the surface contamination inspection device.

DETAILED DESCRIPTION

A radioactive waste body inspection device according to an embodiment includes a surface contamination inspecting unit configured to conduct a surface contamination inspection of a radioactive waste body while acquiring concavo-convex information on the radioactive waste body, and a dose rate inspecting unit configured to conduct a dose rate inspection of the radioactive waste body in consideration of the concavo-convex information.

In the following, embodiments according to the present invention are described in detail with reference to the drawings.

(First Embodiment)

Figure 1:
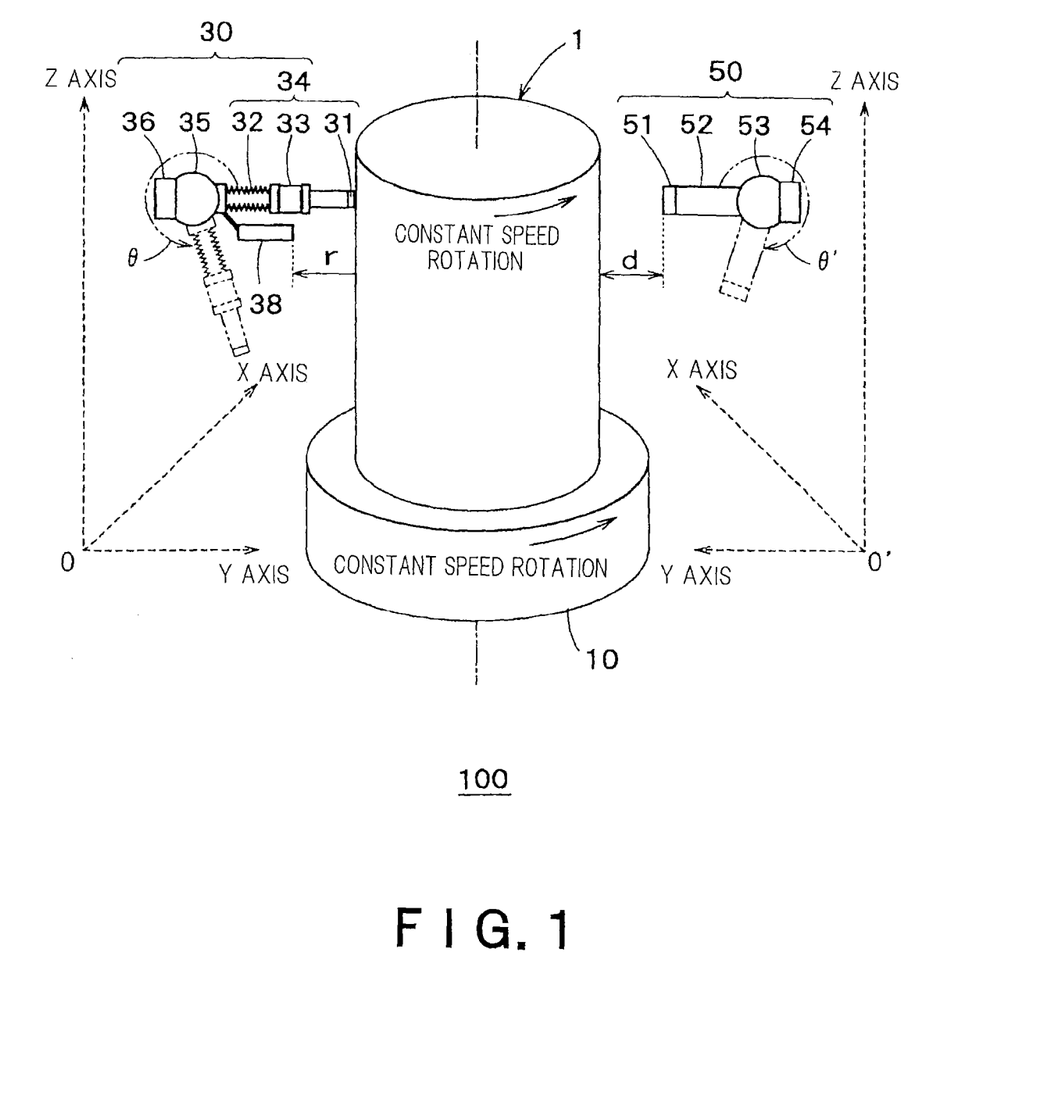
FIG. 1 is an outline view of a radioactive waste body inspection device 100 according to the first embodiment.
Figure 2:
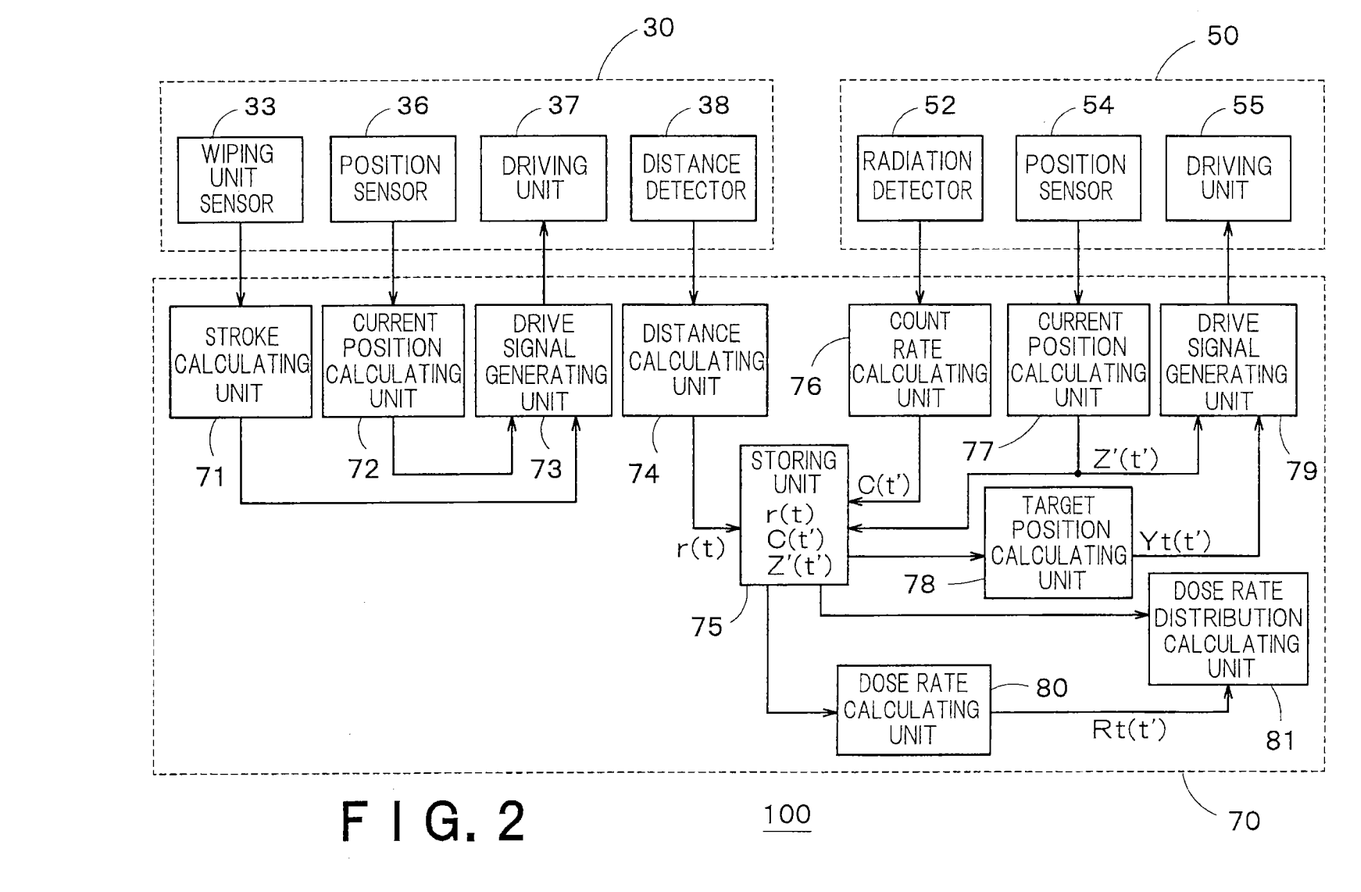
FIG. 2 is a system block diagram of the inspection device 100 in FIG. 1.

FIG. 1 is an outline view of the radioactive waste body inspection device 100 (which is simply referred to as "inspection device" below) according to the first embodiment. Moreover, FIG. 2 is a system block diagram of the inspection device 100 in FIG. 1. The inspection device 100 is used in, for example, an acceptance factory of radioactive waste bodies, and includes an inspection table 10, a surface contamination inspecting unit 30, a dose rate inspecting unit 50 and a controller 70 (which is not illustrated in FIG. 1).

The radioactive waste body 1 is placed on the inspection table 10. The inspection table 10 has a driving unit (which is not illustrated) controlled by the controller 70, and this driving unit rotates the inspection table 10 at a constant speed. By this means, the radioactive waste body 1 placed on the inspection table 10 rotates at the constant speed. Although there is no specific limitation in the cross-sectional shape of the inspection table 10, the present embodiment illustrates an example in which it has a circular shape. In a case where the inspection table 10 has a circular shape, a vertical line passing the center of the inspection table 10 is referred to as "central line of the inspection table 10".

In the present embodiment, it is assumed to examine the radioactive waste body 1 of a cylindrical shape such as a drum in which a low-level radioactive waste is filled. However, the radioactive waste body 1 has a concavity and convexity or deformation on the surface due to a manufacturing error or the like, and may not have a complete cylindrical shape. Moreover, although it is desirable to place the radioactive waste body 1 such that its center accurately locates on the central line of the inspection table 10, it may slightly shift from the central line. When the position of the radioactive waste body 1 shifts from the central line of the inspection table 10, from a surface contamination inspecting unit 30 and the dose rate inspecting unit 50, it appears that there is a concavity and convexity on the radioactive waste body 1.

According to the present embodiment, even in this case, it is possible to accurately conduct a dose rate examination. In the following, information on the above-mentioned concavity and convexity, deformation and shift from the central line is collectively referred to as "concavo-convex information on the radioactive waste body 1".

The surface contamination inspecting unit 30 conducts a surface contamination inspection by wiping off the surface (for example, side surface) of the radioactive waste body 1 placed on the inspection table 10 at appropriate press power. Further, the surface contamination inspecting unit 30 generates concavo-convex information on the radioactive waste body 1 at the time of the surface contamination inspection.

As a specific configuration example, the surface contamination inspecting unit 30 includes a wiping material 31, a buffer material 32, a wiping unit sensor 33, a movable element (first movable element) 35, a position sensor 36, a driving unit (not illustrated) 37 and a distance detector 38.

The wiping material 31 is, for example, a paper filter. Dirt and dust attached to the surface are wiped off by rotating and moving the radioactive waste body 1 in a state where the wiping material 31 is pressed against the surface of the radioactive waste body 1. The wiping material 31 is collected after the wiping ends, and the surface contamination density is acquired by measuring the radiation dose of the wiping material 31.

The buffer material 32 is, for example, a spring. The buffer material 32 presses the wiping material 31 against the surface of the radioactive waste body 1 at appropriate power by performing expansion and contradiction according to the surface of the radioactive waste body 1. For example, the buffer material 32 expands in a case where the wiping target position in the radioactive waste body 1 dents, and the buffer material 32 shrinks in a case where it bulges.

The wiping unit sensor 33 detects a pressure at which the buffer material 32 presses the wiping material 31 against the radioactive waste body 1, and supplies a signal indicating this pressure to the controller 70. The detected pressure corresponds to the expansion and contraction (stroke) of the buffer material 32.

The wiping material 31, the buffer material 32 and the wiping unit sensor 33, which are described above, form a wiping unit 34.

The movable element 35 moves the wiping unit 34 in four axis directions of X, Y, Z and θ. As an example, origin O of the X, Y and Z axes is set to an arbitrary point. Further, the Y axis is a direction from origin O to the central line of the inspection table 10 in the horizontal plane. The X axis is a direction orthogonal to the Y axis in the horizontal plane. The Z axis is a vertical direction. Moreover, the θ axis is a rotation direction in the vertical plane including the movable element 35 and the central line of the inspection table 10, for example, the wiping unit 34 faces the radioactive waste body 1 when θ is 0 degrees, and the wiping unit 34 faces downward when θ is 270 degrees. Here, in a case where the radioactive waste body 1 has a cylindrical shape, the movable element 35 only has to be movable at least in the Z axis direction.

The position sensor 36 detects each position on the X, Y, Z and θ axes (which is written as "position (X, Y, Z, θ) below") of the movable element 35, and supplies a position signal indicating this position to the controller 70.

The driving unit 37 drives the movable element 35 according to a control signal from the controller 70 and moves the movable element 35 to s predetermined position at an appropriate speed.

The distance detector 38 is, for example, a laser or ultrasonic non-contact detector. The distance detector 38 only has to move in synchronization with the movable element 35, and is fixed to the side of the movable element 35 (the movable element 35 in the example of FIG. 1) by the buffer material 32. The distance detector 38 detects distance r between the front edge of the distance detector 38 and the wiping target position on the surface of the radioactive waste body 1 (which is referred to as "surface contamination inspection distance r" below), and supplies a distance signal indicating this surface contamination inspection distance r to the controller 70. In a case where there is a concavity and convexity on the surface of the radioactive waste body 1, surface contamination inspection distance r is not constant but is a value depending on the wiping target position on the surface of the radioactive waste body 1.

One of the features of the present embodiment is that the dose rate inspecting unit 50 conducts a dose rate inspection using surface contamination inspection distance r as concavo-convex information in consideration of surface contamination inspection distance r. By this means, it is possible to improve the accuracy of the dose rate inspection.

Subsequently, the dose rate inspecting unit 50 is continuously described. The dose rate inspecting unit 50 is set in a position different from the surface contamination inspecting unit 30, that is, in a symmetrical position to the surface contamination inspecting unit 30 about the central line of the inspection table 10 in the example of FIG. 1.

The dose rate inspecting unit 50 conducts a dose rate inspection of the radioactive waste body 1 placed on the inspection table 10 in consideration of concavo-convex information acquired by the surface contamination inspecting unit 30. To be more specific, even in a case where there is a concavity and convexity on the surface of the radioactive waste body 1 or the radioactive waste body 1 is placed while shifting from the center of the inspection table 10, by considering the concavo-convex information, the dose rate inspecting unit 50 detects a radiation ray from the radioactive waste body 1 in a substantially constant distance from the surface of the radioactive waste body 1.

As a specific configuration example, the dose rate inspecting unit 50 includes the collimator 51, a radiation detector 52, a movable element (second movable element) 53, a position sensor 54 and a driving unit 55 (not illustrated in FIG. 1).

The collimator 51 is attached to the front edge of the radiation detector 52 and limits the detection range of radiation.

The radiation detection object position in the radioactive waste body 1 is defined by the collimator 51.

The radiation detector 52 detects radiation from the radiation detection object position and supplies, a count signal indicating the count rate of the detected radiation to the controller 70. Here, the collimator 51 does not contact the radiation detection object position of the radioactive waste body 1 and is separated by distance d (which is referred to as "dose rate inspection distance d" below). By keeping dose rate inspection distance d constant as described later, the radiation detector 52 can detect the radiation accurately.

The movable element 53 moves the collimator 51 and the radiation detector 52 in four axis directions of X', Y', Z' and θ'. As an example, origin O' of the X', Y' and Z' axes are positions symmetrical to origin O of the X, Y and Z axes about the central line of the inspection table 10. Further, the X' axis is a direction parallel to the X axis and faces the same direction as the X axis. Moreover, the Y' axis is a direction from origin O' in the horizontal plane to the central line of the inspection table 10, in other words, it is parallel to the Y axis and faces a direction opposite to the Y axis. Further, the Z' axis is a vertical direction. Moreover, the θ' axis is a rotation direction in the vertical plane including the movable element 53 and the central line of the inspection table 10.

In a case where the radioactive waste body 1 has a cylindrical shape, although the movable element 53 only has to be movable in the Z' axis direction, the movable element 53 is movable also in the Y' axis direction in order to keep dose rate inspection distance d constant.

In the present embodiment, the movable element 53 moves the collimator 51 and the radiation detector 52 such that dose rate inspection distance d between the collimator 51 and the radiation detection object position becomes constant, in other words, the distance between the radiation detector 52 and the radiation detection object position becomes constant.

The position sensor 54 and the driving unit 55 are substantially similar to the position sensor 36 and the driving unit 37 of the surface contamination inspecting unit 30 respectively, and therefore explanation thereof is omitted.

The controller 70 includes stroke calculating unit 71, current position calculating unit 72, drive signal generating unit 73, distance calculating unit 74 and the storing unit 75 for surface contamination inspection.

The stroke calculating unit 71 calculates the stroke (expansion and contraction) of the buffer material 32 on the basis of the signal supplied from the wiping unit sensor 33. The calculated stroke is supplied to the drive signal generating unit 73. The wiping unit 34 can monitor the power pressed against the radioactive waste body 1 on the basis of the stroke. Moreover, the calculated stroke may be stored in the storing unit 75

The current position calculating unit 72 calculates position (X, Y, Z, θ) of the movable element 53 on the basis of the position signal supplied from the position sensor 36. The calculated position is optionally subjected to error correction and supplied to the drive signal generating unit. Moreover, the calculated position may be stored in the storing unit 75.

The drive signal generating unit 73 generates a drive signal to control the driving unit 37 on the basis of the stroke of the buffer material 32 and position (X, Y, Z, θ) of the movable element 35. The driving unit 37 drives the movable element 35 on the basis of this drive signal. For example, the drive signal generating unit 73 drives the driving unit 37 and controls the position of the movable element 35 to an appropriate position such that the power of the wiping unit 34 pressed against the radioactive waste body 1 does not become large excessively.

The distance calculating unit 74 calculates surface contamination inspection distance r on the basis of the distance signal supplied from the distance detector 38 and is stored in the storing unit 75. Actually, surface contamination inspection distance r is a function of time t with reference to the start time of the surface contamination inspection (that is, the rotation movement start time of the radioactive waste body 1). Therefore, the surface contamination inspection distance as concavo-convex information is written as r(t).

Moreover, the controller 70 includes count rate calculating unit 76, current position calculating unit 77, target position calculating unit 78, drive signal generating unit 79, dose rate calculating unit 80 and dose rate distribution calculating unit 81 for dose rate inspection. The storing unit 75 storing concavo-convex information is used for the dose rate inspection too.

The count rate calculating unit 76 calculates count rate C on the basis of the count signal supplied from the radiation detector 52. Count rate C is stored in the storing unit 75 as function C(t') of time t' with reference to the dose check beginning.

The current position calculating unit 77 calculates position (X', Y', Z', θ') of the movable element 53 on the basis of the position signal supplied from the position sensor 54. At least position Z' of the calculated position is stored in the storing unit 75 as function Z'(t') of time t'. Moreover, position (X', Y', Z', θ') is supplied to the drive signal generating unit 79.

The target position calculating unit 78 generates a target position control signal indicating target position Yt(t') of position Y' of the movable element 53 on the basis of surface contamination inspection distance r(t) stored in the storing unit 75. This target position Yt(t') is a distance to keep dose rate inspection distance d constant. The target position control signal is supplied to the drive signal generating unit 79.

The drive signal generating unit 79 generates a drive signal to control the driving unit 55, on the basis of position (X', Y', Z', θ') of the movable element 53 and the target position control signal. The driving unit 55 drives the movable element 53 on the basis of this drive signal.

The dose rate calculating unit 80 converts count rate C(t') stored in the storing unit 75 into dose rate R(t') by the use of a predetermined conversion scheme.

The dose rate distribution calculating unit 81 calculates dose rate distribution on the basis of dose rate R(t') and position Z'(t') stored in the storing unit 75. As the dose rate distribution, for example, dose rate R(p) in arbitrary position p of the radioactive waste body 1 is calculated.

Here, the controller 70 is, for example, a computer, and each unit is realized by executing a predetermined examination program in a processor.

Figure 3:
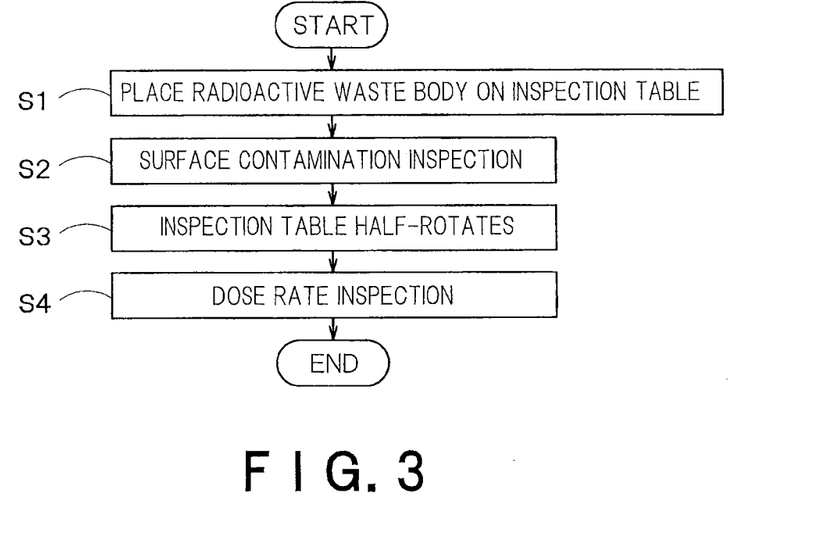
FIG. 3 is a flowchart illustrating a schematic procedure of inspection of a radioactive waste body 1 by the use of the inspection device 100 in FIG. 1.

FIG. 3 is a flowchart illustrating a schematic procedure of inspection of the radioactive waste body 1 using the inspection device 100 in FIG. 1. First, the radioactive waste body 1 is placed on the inspection table 10 (step S1).

Subsequently, a surface contamination inspection by the surface contamination inspecting unit 30 is conducted (step S2). By this surface contamination inspection, surface contamination inspection distance r(t) is stored in the storing unit 75 as concavo-convex information of the radioactive waste body 1. Details of the surface contamination inspection are specifically described later using FIG. 4.

When the surface contamination inspection ends, the inspection table 10 half-rotates (step S3). Then, a dose rate inspection by the dose rate inspecting unit 50 is conducted using surface contamination inspection distance r(t) stored in the storing unit 75 (step S4). Details of the dose rate inspection are specifically described later using FIG. 8.

Thus, in the present embodiment, both the surface contamination inspection and the dose rate inspection are conducted while the radioactive waste body 1 is placed on the inspection table 10, in other words, without removing the radioactive waste body 1 from the inspection table 10. Therefore, it is possible to accurately conduct the dose rate inspection in consideration of a concavity and convexity on the surface of the radioactive waste body 1, and so on.

Figure 4:
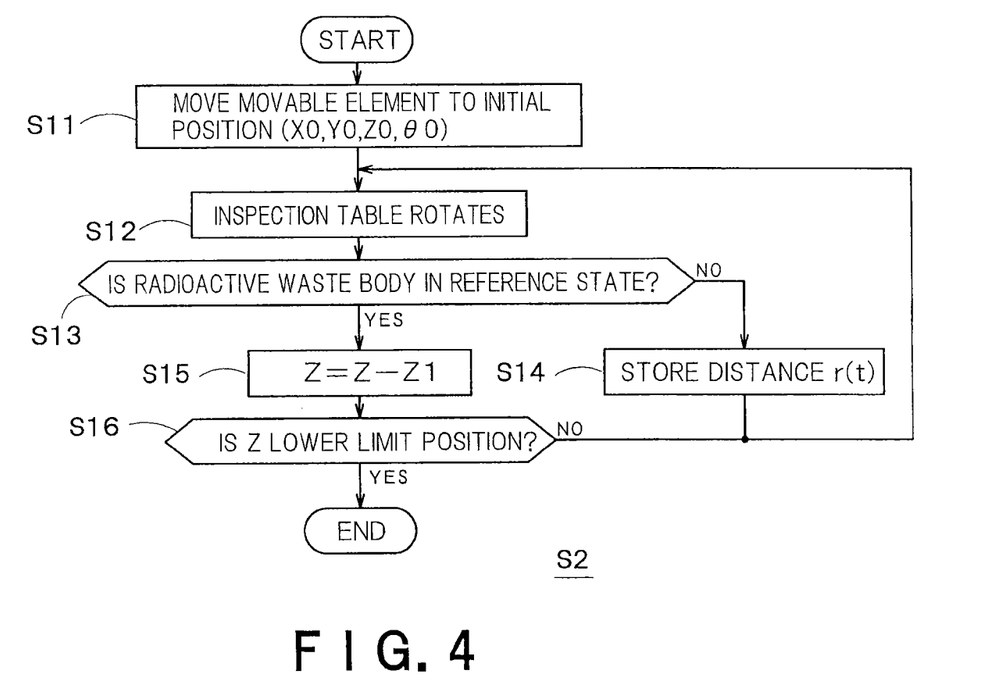
FIG. 4 is a flowchart illustrating a procedure of a surface contamination inspection.

FIG. 4 is a flowchart illustrating a procedure of the surface contamination inspection, which is details of step S2 in FIG. 3.

First, according to a drive signal generated by the drive signal generating unit 73, the driving unit 37 moves the movable element 35 to an initial position (X0, Y0, Z0, θ0) (step S11). Initial position θ0 is, for example, 0 degrees, such that the wiping unit 34 turns to the center of the radioactive waste body 1. Moreover, initial position Z0 is, for example, a position on the upper surface of the radioactive waste body 1. The position of the radioactive waste body 1 before the inspection table 10 rotates is referred to as "reference state".

Figure 5:
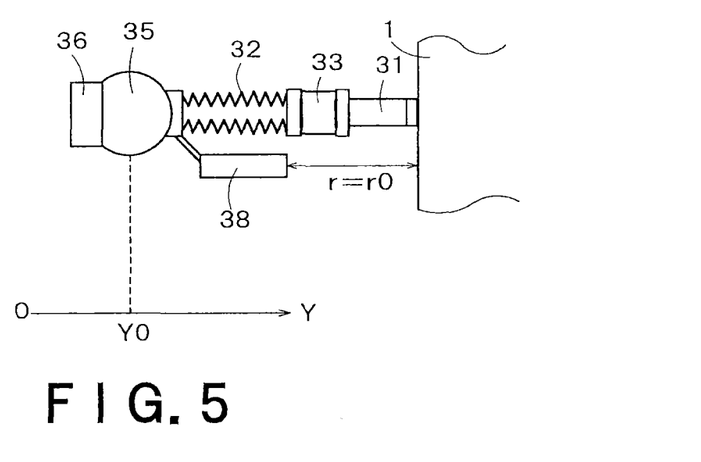
FIG. 5 is a diagram illustrating the positional relationship between a distance detector 38 and the radioactive waste body 1 in step S11.

FIG. 5 is a diagram illustrating the positional relationship between the distance detector 38 and the radioactive waste body 1 in step S11. As illustrated in the figure, in a case where it is assumed that there is no concavity and convexity or the like on the surface of the radioactive waste body 1, surface contamination inspection distance r becomes reference range r0. Baseline inspection r0 is, for example, a design value defined beforehand.

In this state, the inspection table 10 rotates (step S12 in FIG. 4). By this means, the wiping material 31 wipes off the surface of the radioactive waste body 1. While the radioactive waste body 1 goes into a 360-degree roll, the movable element 35 does not move. However, in a case where there is a concavity and convexity or the like on the surface of the radioactive waste body 1, the buffer material 32 expands and contracts. By this means, it is possible to press the wiping material 31 against the surface of the radioactive waste body 1 at appropriate power.

Until the time the radioactive waste body 1 goes into a 360-degree roll and returns to the reference state ("NO" in step S13), the distance calculating unit 74 calculates surface contamination inspection distance r(t) on the basis of a distance signal from the distance detector 38 and stores it in the storing unit 75 (step S14). Here, "t" indicates the time with reference to the surface contamination inspection start, that is, the rotation start of the inspection table 10. Surface contamination inspection distance r(t) is expressed by following Equation (1) using gap dr(t) from reference range r0.

$$r(t)=r0+dr(t) \qquad (1)$$

This dr(t) may be considered as concavo-convex information showing the concavity and convexity or the like on the surface of the radioactive waste body 1. Moreover, instead of distance r(t), gap dr(t) from reference range r0 may be stored in the storing unit 75.

Figure 6:
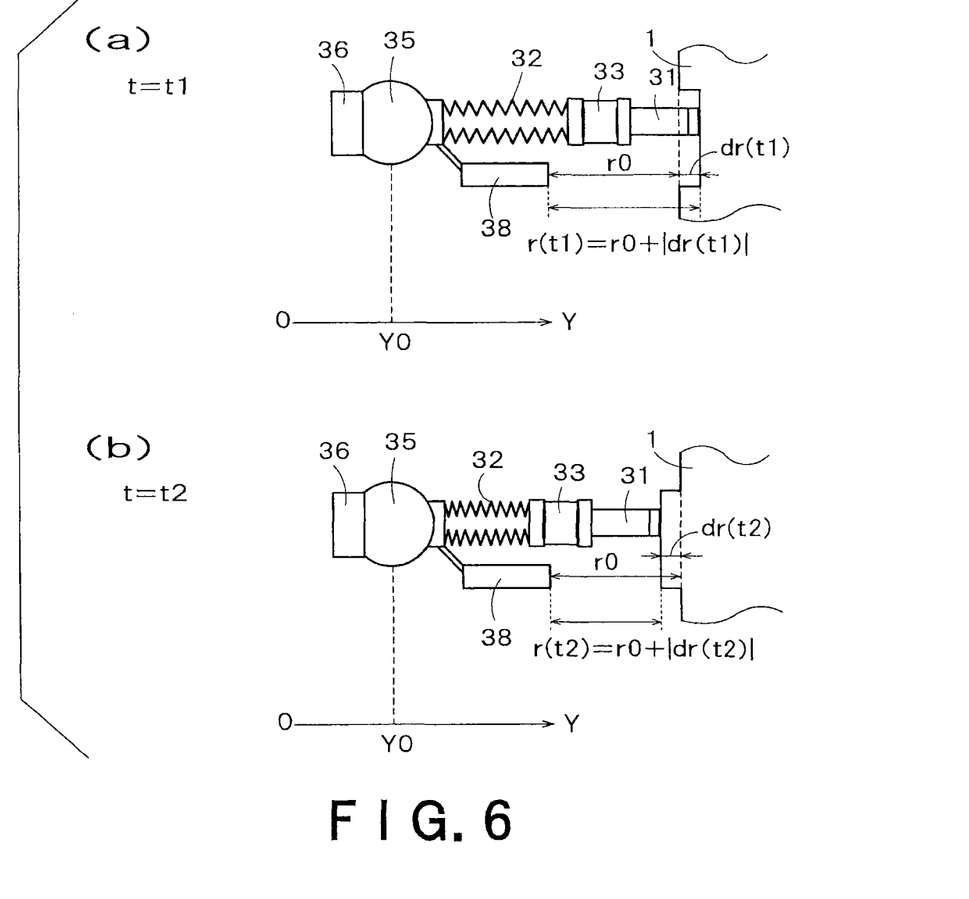
FIG. 6 is a diagram illustrating an example of the positional relationship between the distance detector 38 and the radioactive waste body 1 in step S12.

FIG. 6 is a diagram illustrating an example of the positional relationship between the distance detector 38 and the radioactive waste body 1 in step S12. (a) of the figure typically illustrates a case where there is a concave portion in the wiping target position at time t=t1, to be more specific, a case where the wiping target position dents by |dr(t1)|. In this case, the buffer material 32 expands and surface contamination inspection distance r(t1) becomes longer than reference range r0 by |dr(t1)|. On the other hand, (b) of the figure typically illustrates a case where there is a convex portion in the wiping target position at time t=t2, to be more specific, a case where the wiping target position bulges by |dr(t2)|. In this case, the buffer material 32 shrinks and surface contamination inspection distance r(t2) becomes shorter than reference range r0 by |dr(t2)|.

Afterward, when the radioactive waste body 1 goes into a 360-degree roll and returns to the reference state ("YES" in step S13 of FIG. 4), the driving unit 37 lowers the position of the movable element 35 in the Z axis direction by predetermined value Z1 (step S15). This operation is realized by generating a drive signal to move the movable element 35 in the Z axis direction until the position of the movable element 35 calculated by the current position calculating unit 72 becomes (X0, Y0, Z0−Z1, θ0).

Further, processing in steps S12 to S14 is performed in new position (Z0−Z1) of the movable element 35. The above-mentioned steps S12 to S15 are executed until the position in the Z axis direction becomes the lower limit position of the radioactive waste body 1 (step S16). As stated above, the wiping of the entire surface of the radioactive waste body 1 is completed.

Figure 7:
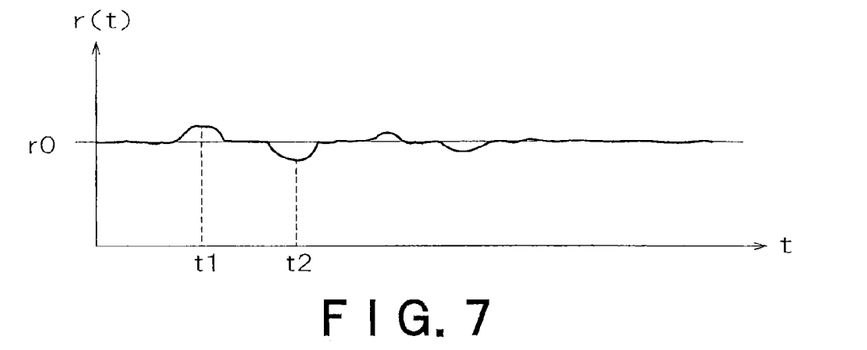
FIG. 7 is a diagram illustrating one example of surface contamination inspection distance r(t) stored in a storing unit 75.

FIG. 7 is a diagram illustrating one example of surface contamination inspection distance r(t) stored in the storing unit 75. Here, in FIG. 7, the time required for the movable element 35 to move in the Z axis direction is disregarded (step S15 in FIG. 4). By conducting a surface contamination inspection as illustrated in the figure, surface contamination inspection distance r(t) at time t is stored in the storing unit 75.

For example, as illustrated in FIG. 6(a), in the wiping target position at time t1, since there is a concave portion on the surface of the radioactive waste body 1, surface contamination inspection distance r(t1) becomes longer than reference range r0. On the other hand, as illustrated in FIG. 6(b), in the wiping target position at time t2, since there is a convex portion on the surface of the radioactive waste body 1, surface contamination inspection distance r(t2) becomes shorter than reference range r0.

Figure 8:
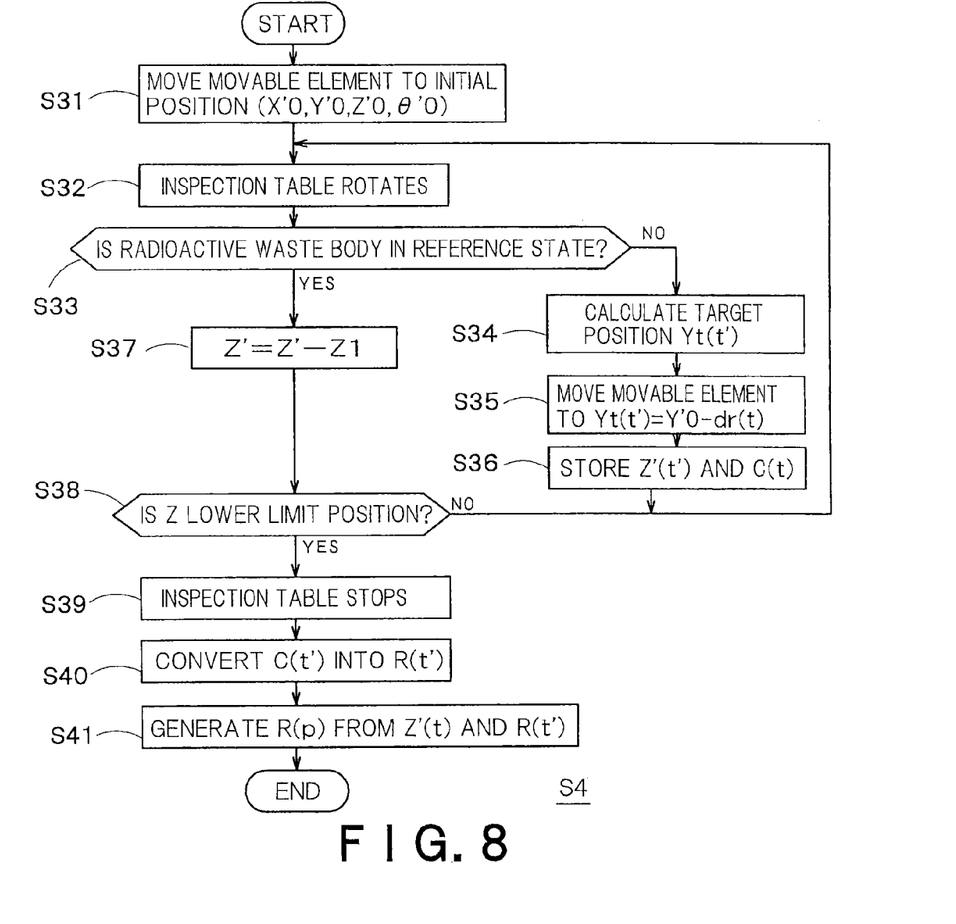
FIG. 8 is a flowchart illustrating a procedure of a dose rate inspection.

Subsequently, the dose rate inspection is described. FIG. 8 is a flowchart illustrating a procedure of the dose rate inspection, which is details of step S4 in FIG. 3. Here, before the dose line inspection, the inspection table 10 half-rotates (step S3 in FIG. 3). In the following, the position of this half-rotated radioactive waste body 1 is assumed to be a reference state.

First, according to a drive signal generated by the drive signal generating unit 79, the driving unit 55 moves the movable element 53 to initial position (X'0, Y'0, Z'0, θ'0) (step S31). In a case where the X', Y', Z' and θ' axes are set as described above, the initial position is expressed by X'0=X0, Z0=Z'0 and θ'0=θ0, which corresponds to the initial position at the time of the surface contamination inspection. Moreover, initial position Y' is defined such that dose rate inspection distance d becomes reference range d0.

Figure 9:
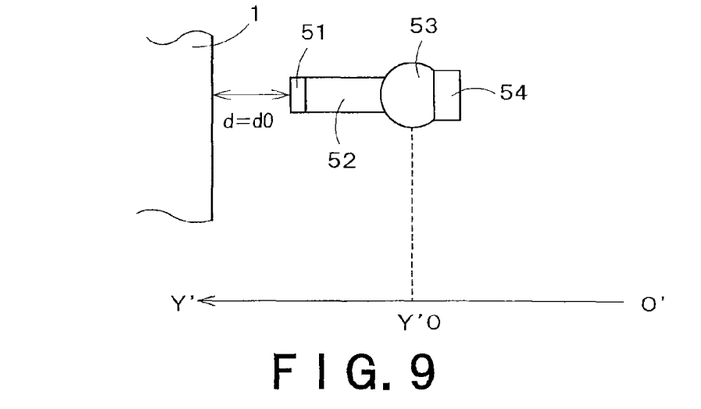
FIG. 9 is a diagram illustrating the positional relationship between a collimator 51 and the radioactive waste body 1 in step S31.

FIG. 9 is a diagram illustrating the positional relationship between the collimator 51 and the radioactive waste body 1 in step S31. As illustrated in the figure, in a case where there is no concavity and convexity or the like on the surface of the radioactive waste body 1, when the movable element 53 is in initial position Y'0, dose rate inspection distance d is reference range d0. In the present embodiment, since control is performed such that dose rate inspection distance d is kept constant, it is possible to reduce reference range d0. As a result, it is possible to detect a radiation accurately and miniaturize the inspection device 100.

In this state, the inspection table 10 rotates (step S32 in FIG. 8). While the radioactive waste body 1 goes into a 360-degree roll, the movable element 53 does not move in the X', Z' and θ' axis directions. However, the movable element 53 moves in the Y' axis direction as described below, such that dose rate inspection distance d becomes constant even in a case where there is a concavity and convexity on the surface of the radioactive waste body 1.

Until the time the radioactive waste body 1 goes into a 360-degree roll and returns to the reference state ("NO" in step S33), the target position calculating unit 78 refers to surface contamination inspection distance r(t) (FIG. 7) stored in the storing unit 75. Further, based on following Equation (2), the target position calculating unit 78 calculates target position Yt(t') of the movable element 53 (step S34). Target position Yt(t') is a position of the movable element 53 on the Y' axis to make dose rate inspection distance d become constant reference range d0 even in a case where there is a concavity and convexity on the surface of the radioactive waste body 1.

$$Yt(t')=Y'0-dr(t') \qquad (2)$$

Here, t' indicates the time with reference to the dose rate inspection start, that is, the rotation start of the inspection table 10 (step S32). Since the inspection table 10 rotates at a constant speed, the wiping target position at time t=T0 is equal to the radiation detection target position at time t'=T0. Therefore, t'=t is established.

Subsequently, the drive signal generating unit 79 generates a drive signal such that position Y' of the movable element 53 becomes target position Yt(t'). By this means, the movable element 53 moves to target position Yt(t') (step S35). It is specifically shown that dose rate inspection distance d becomes constant reference range d0 as a result of such operation.

Figure 10:
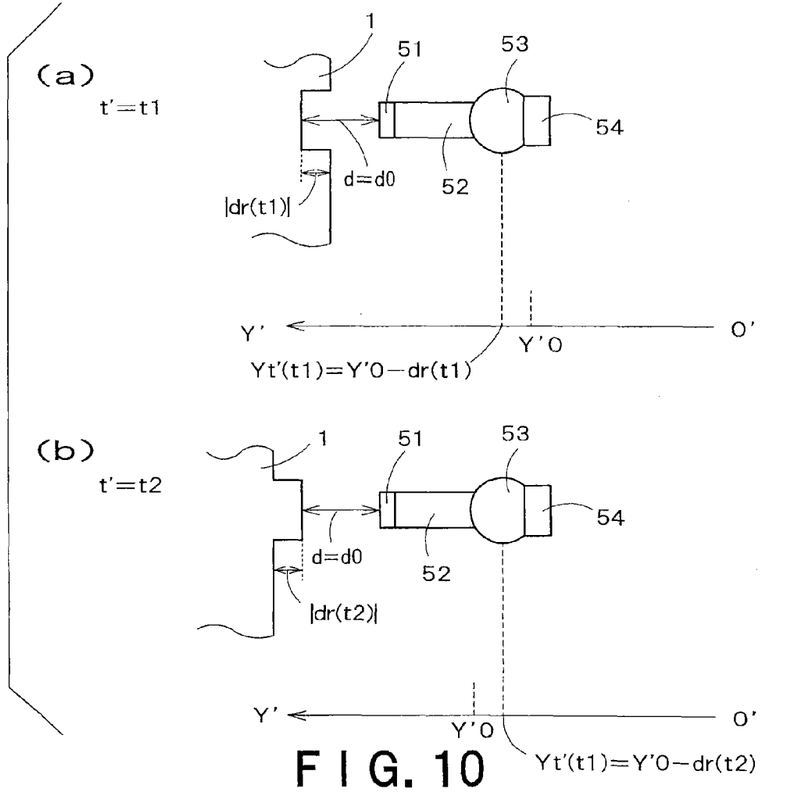
FIG. 10 is a diagram illustrating an example of the positional relationship between the collimator 51 and the radioactive waste body 1 in step S35.

FIG. 10 is a diagram illustrating an example of the positional relationship between the collimator 51 and the radioactive waste body 1 in step S35. (a) of the figure typically illustrates a case where there is a concave portion in the radiation detection target position at time t'=t1, to be more specific, a case where it dents by |dr(t1)|, which corresponds to FIG. 6(a). In this case, target position Yt(t1) of the movable element 53 is set larger than initial position T0 by |dr(t1)|, and the collimator 51 approaches the radioactive waste body 1. By this means, dose rate inspection distance d becomes reference range d0.

On the other hand, FIG. 10(b) typically illustrates a case where there is a convex portion in the radiation detection target position at time t'=t2, more specifically a case where it dents by |dr(t2)|. In this case, position Yt(t2) of the movable element 53 is set smaller than initial position Y'0 by |dr(t2)|, and the collimator 51 moves away from the radioactive waste body 1. By this means, dose rate inspection distance d becomes reference range d0.

By performing such processing, dose rate inspection distance d always becomes constant and it is possible to improve the measurement accuracy.

Returning to FIG. 8, count rate C(t') calculated by the count rate calculating unit 76 is stored in the storing unit 75 together with position Z'(t) calculated by the current position calculating unit (step S36).

Afterward, when the radioactive waste body 1 goes into a 360-degree roll and returns to the reference state ("YES" in step S33), the driving unit 55 lowers the position of the movable element 53 in the Z' axis direction by predetermined value Z1 (step S37).

Further, processing in steps S32 to S36 is performed in new position Z0'−Z1 of the movable element 53. The above-mentioned steps S32 to S37 are executed until the position in the Z' axis direction becomes the lower limit position of the radioactive waste body 1 (step S38). As stated above, the count rate measurement of the entire surface of the radioactive waste body 1 is completed and the inspection table 10 stops (step S39).

Subsequently, the dose rate calculating unit 80 converts count rate C(t') into dose rate R(t') by the use of a predetermined conversion scheme (step S40).

Further, the dose rate distribution calculating unit 81 calculates dose rate distribution R(p) of the radioactive waste body 1 (p is a position in the radioactive waste body 1) on the basis of dose rate R(t') and position Z'(t') (step S41). To be more specific, since the inspection table 10 rotates at constant speed, the dose rate distribution calculating unit 81 calculates the relationship between time t' and radiation detection target position p, from position Z'(t'). Further, the dose rate distribution calculating unit 81 converts dose rate R(t') that is the function of time t' into dose rate distribution R(p) that is the function of radiation detection target position p.

Thus, in the first embodiment, when the surface contamination inspection is conducted, concavo-convex information on the radioactive waste body 1 is acquired. Therefore, based on this concavo-convex information, dose rate inspection distance d that is the distance between the collimator 51 and the radioactive waste body 1 can be kept constant. Therefore, the distance between the collimator 51 and the radioactive waste body 1 need not be lengthened, and it is possible to achieve miniaturization and improve the accuracy of the dose rate measurement.

Moreover, both the surface contamination inspection and the dose rate inspection are conducted by rotating the inspection table 10 in a state where the radioactive waste body 1 is placed on the inspection table 10. Therefore, it is not necessary to move the radioactive waste body 1 from the surface contamination inspecting unit 30 to the dose rate inspecting unit 50, and it is possible to shorten the time required for the inspection.

(Second Embodiment)

The second embodiment described below uses a plurality of distance detectors 38.

Figure 11:
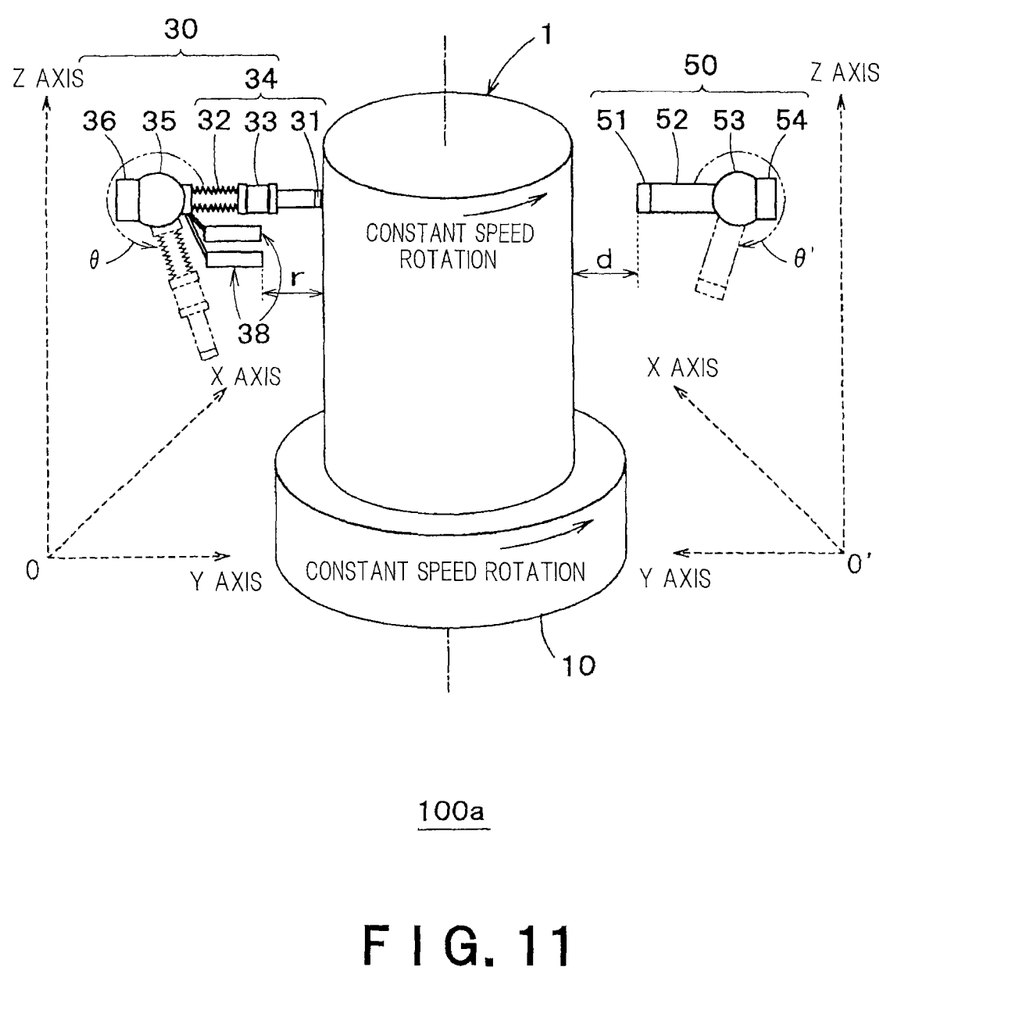
FIG. 11 is an outline view of a radioactive waste body inspection device 100a according to the second embodiment.
Figure 12:
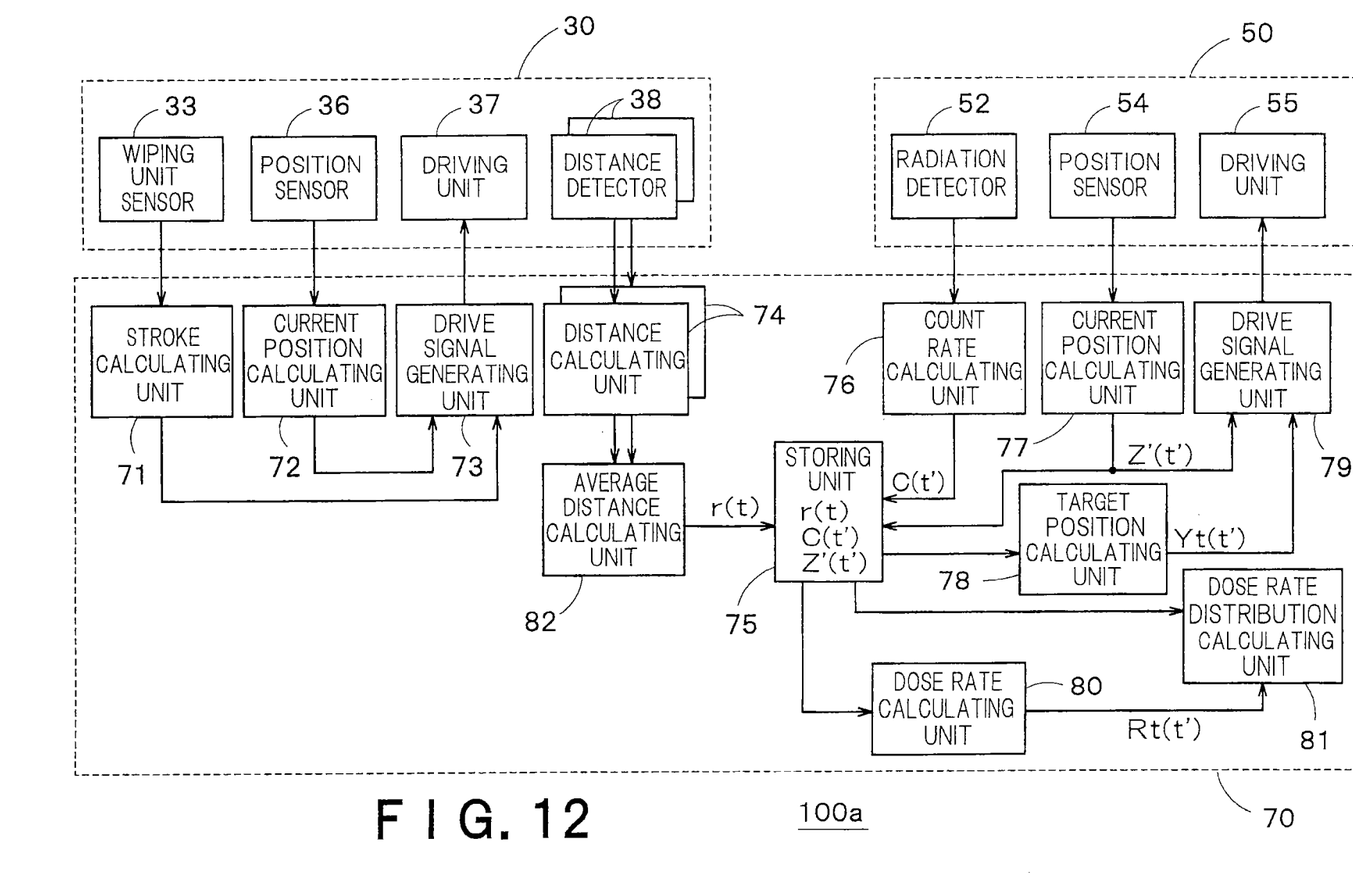
FIG. 12 is a system block diagram of the inspection device 100a in FIG. 11.

FIG. 11 is an outline view of the radioactive waste body inspection device 100a according to the second embodiment. Moreover, FIG. 12 is a system block diagram of the inspection device 100a in FIG. 11. In FIG. 11 and FIG. 12, the same reference numerals are assigned to respective common components with FIG. 1, FIG. 2, and different points are mainly described below.

The surface contamination inspecting unit 30 of the inspection device 100a has a plurality of distance detectors 38. Further, the controller 70 has a plurality of distance calculating unit 74 respectively corresponding to the distance detectors 38, and average distance calculating unit 82. Each of the distance calculating unit 74 calculates a plurality of surface contamination inspection distances on the basis of distance signals supplied from the plurality of distance detectors 38. Further, the average distance calculating unit 82 calculates the average value of the multiple surface contamination inspection distances. Further, when the surface contamination inspection illustrated in FIG. 4 is conducted, in step S14, the above-mentioned average value is used as surface contamination inspection distance r(t), that is, concavo-convex information. Others are similar to the first embodiment.

Thus, even in the second embodiment, similar to the first embodiment, it is possible to achieve miniaturization and improve the accuracy of the dose rate measurement. Further, in the second embodiment, since the plurality of distance detectors 38 are used, it is possible to accurately measure surface contamination inspection distance r(t). As a result, it is possible to further improve the accuracy of the dose rate measurement.

(Third Embodiment)

In the above-mentioned first and second embodiments, it is assumed to generate concavo-convex information by the use of the distance detector 38. By contrast with this, in the third embodiment described below, concavo-convex information is generated using the wiping unit sensor 33.

Figure 13:
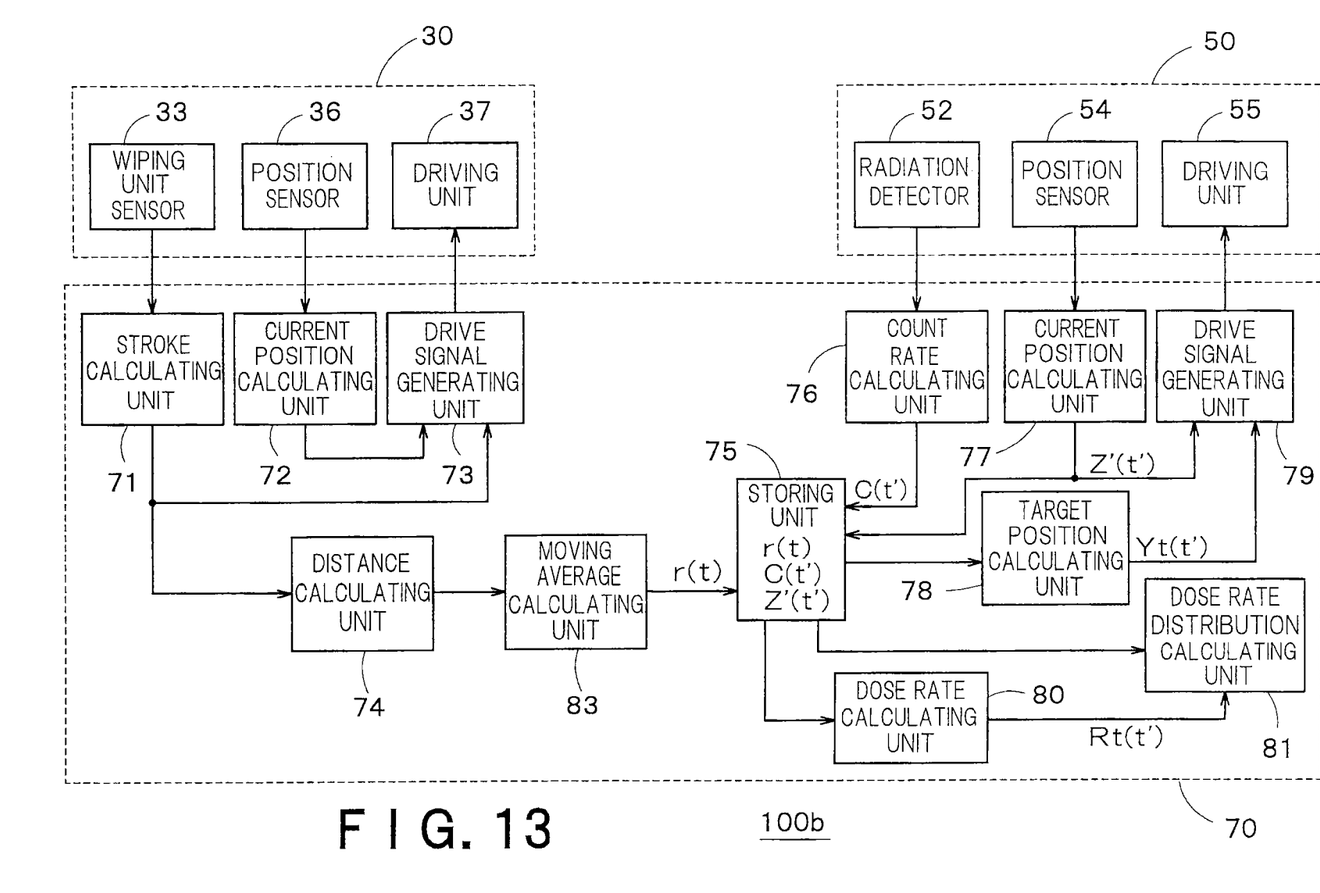
FIG. 13 is a system block diagram of a radioactive waste body inspection device 100b according to the third embodiment.

FIG. 13 is a system block diagram of the radioactive waste body inspection device 100b of according to the third embodiment. In FIG. 13, the same reference numerals are assigned to respective common components with FIG. 2, and different points are mainly described below. Here, the surface contamination inspecting unit 30 of the inspection device 100b need not necessarily include the distance detector 38. Further, the distance calculating unit 74 of the controller 70 converts the stroke (expansion and contraction information) calculated by the stroke calculating unit 71 into surface contamination inspection distance r.

Since the buffer material 32 expands and contracts according to a concavity and convexity on the surface of the radioactive waste body 1, a stroke corresponds to concavo-convex information on the surface of the radioactive waste body 1. Therefore, when the surface contamination inspection illustrated in FIG. 4 is conducted, surface contamination inspection distance r based on the stroke can be used as concavo-convex information in step S14. That is, in the present embodiment, pressure output by the wiping unit sensor 33 can be used for concavo-convex information in place of the output of the distance detector 38 in the first and second embodiments.

Therefore, the distance detector 38 need not be newly installed, and it is possible to simplify the configuration of the inspection device 100b. Alternatively, the distance detector 38 and the wiping unit sensor 33 may be used together to generate concavo-convex information at higher accuracy.

Moreover, the controller 70 may further include moving average calculating unit 83. The moving average calculating unit 83 calculates the moving average of surface contamination inspection distance r calculated by the distance calculating unit 74. Even in a case where a signal output from the wiping unit sensor 33 includes noise caused by vibration or the like of the surface contamination inspecting unit 30, it is possible to ease the influence of the noise by using the moving average as concavo-convex information.

Thus, even in the third embodiment, similar to the first embodiment, it is possible to achieve miniaturization and improve the accuracy of dose rate measurement. Further, in the third embodiment, it is possible to generate concavo-convex information on the basis of the output from the wiping unit sensor 33.

(Fourth Embodiment)

The fourth embodiment described below performs interlock such that the collimator 51 does not become too close to the radioactive waste body 1.

Figure 14:
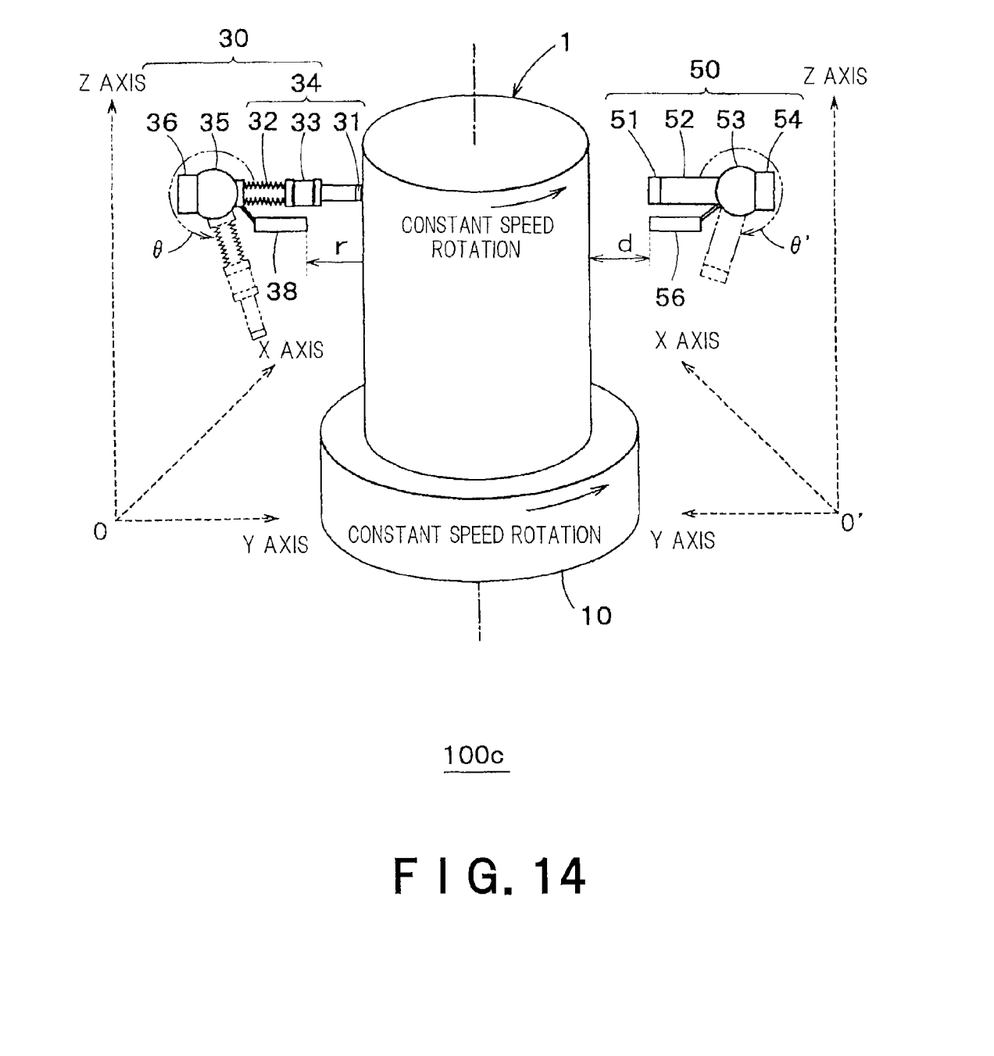
FIG. 14 is an outline view of an radioactive waste body inspection device 100c according to the fourth embodiment.
Figure 15:
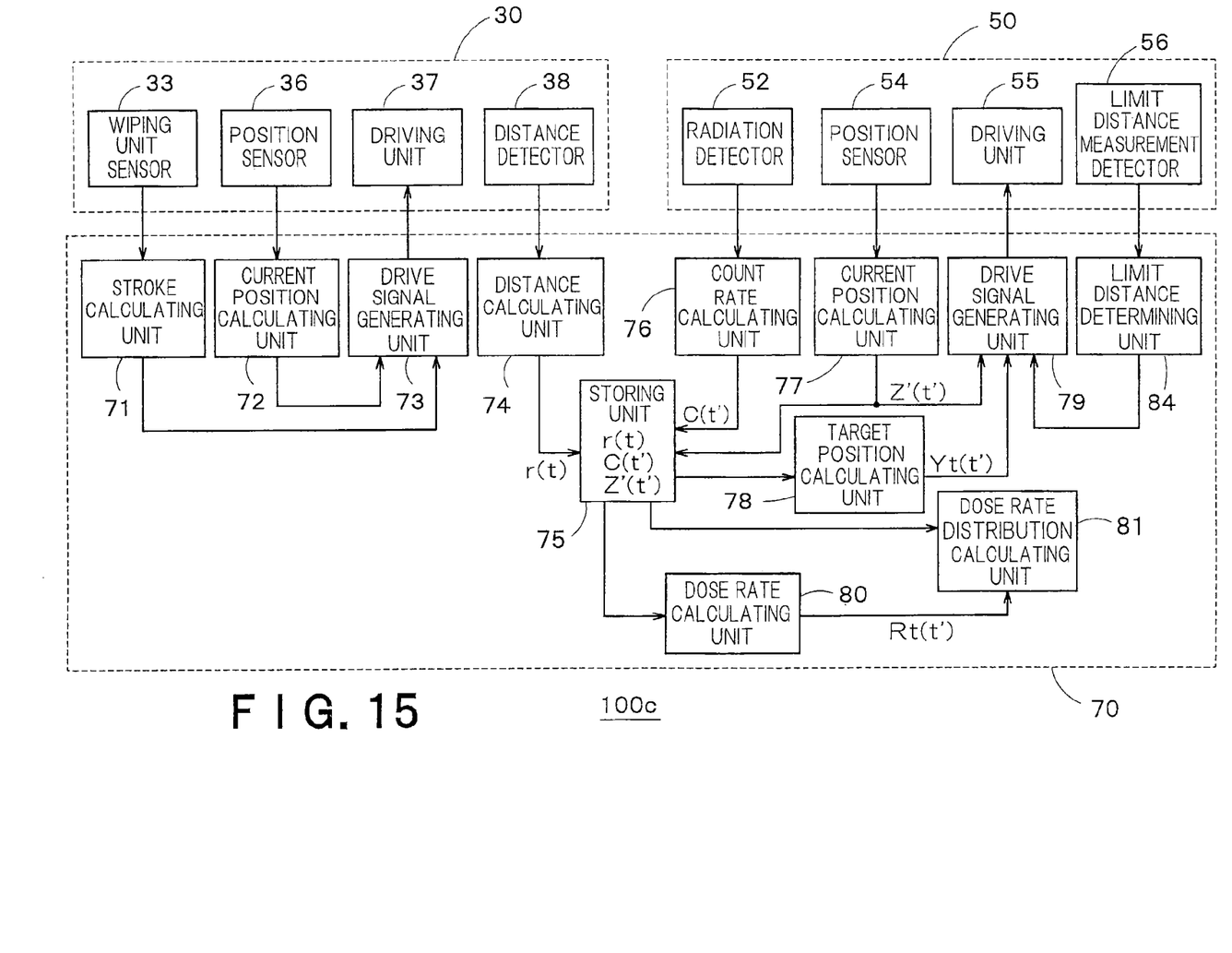
FIG. 15 is a system block diagram of the inspection device 100c in FIG. 13.

FIG. 14 is an outline view of the radioactive waste body inspection device 100c according to the fourth embodiment. Moreover, FIG. 15 is a system block diagram of the inspection device 100c in FIG. 14. In FIG. 14 and FIG. 15, the same reference numerals are assigned to common components with FIG. 1 and FIG. 2, and different points are mainly described below.

The dose rate inspecting unit 50 of the inspection device 100c further includes a limit distance measurement detector 56.

Moreover, the controller 70 includes a limit distance determining unit 84.

The limit distance measurement detector 56 is a simple detector to measure the distance between the collimator 51 and the surface of the radioactive waste body 1. The distance detected by the limit distance measurement detector 56 is input in the limit distance determining unit 84. Further, when the above-mentioned distance becomes equal to or less than a predetermined value, the limit distance determining unit 84 generates a measurement stop signal and supplies it to the drive signal generating unit 79. This predetermined value is a threshold to operate interlock.

According to the measurement stop signal, the drive signal generating unit 79 controls the driving unit 55 such that the collimator 51 gets away from the radioactive waste body 1.

Thus, even in the fourth embodiment, similar to the first embodiment, it is possible to achieve miniaturization and improve the accuracy of dose rate measurement. Further, in the fourth embodiment, since the limit distance measurement detector 56 is installed, it is possible to prevent that the collimator 51 becomes too close to the radioactive waste body 1.

At least part of the controller 70 described in the above-mentioned embodiments may be formed with hardware or software. In a case where it is formed with software, a program that realizes the function of at least part of the controller 70 may be contained in a recording medium such as a flexible disk and a CD-ROM, read by a computer and executed. The recording medium is not limited to the detachable one such as a magnetic disk and an optical disc, and may be a fixed-type recording medium such as a hard disk device and a memory.

Moreover, the program that realizes the function of at least part of the controller 70 may be distributed through a communication line such as the Internet (including wireless communication). Further, the program may be distributed via a wired line or wireless line such as the Internet while it is encrypted, modulated or compressed, or may be contained in a recording medium and distributed.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

The invention claimed is:

1. A radioactive waste body inspection device comprising:
   a surface contamination inspecting unit configured to conduct a surface contamination inspection of a radioactive waste body while acquiring concavo-convex information on the radioactive waste body; and
   a dose rate inspecting unit configured to conduct a dose rate inspection of the radioactive waste body in consideration of the concavo-convex information;
   wherein the surface contamination inspecting unit includes:
   a wiping material configured to wipe off a surface of the radioactive waste body;
   a buffer material configured to press the wiping material against the surface of the radioactive waste body;
   a first movable element configured to move the wiping material and the buffer material; and
   a distance detector configured to move in synchronization with the first movable element and detect a surface contamination inspection distance between the distance detector and a wiping target position on the surface of the radioactive waste body, as the concavo-convex information.

2. The radioactive waste body inspection device of claim 1, wherein:
   the surface contamination inspecting unit includes a plurality of the distance detectors; and
   an average value of surface contamination inspection distances detected by the plurality of the distance detectors is set as the concavo-convex information.

3. The radioactive waste body inspection device of claim 1, wherein:
   the surface contamination inspecting unit wipes off the surface of the radioactive waste body while the radioactive waste body moves; and
   the radioactive waste body inspection device includes a distance calculating unit configured to calculate a relationship between a time with reference to a movement start of the radioactive waste body and the surface contamination inspection distance at the time, as the concavo-convex information.

4. The radioactive waste body inspection device of claim 1, wherein the dose rate inspecting unit includes:
   a collimator configured to define a radiation detection target position in the radioactive waste body;
   a radiation detector configured to detect a radiation from the radiation detection target position; and
   a second movable element configured to move the radiation detector such that a distance between the radiation detector and the radiation detection target position becomes substantially constant, based on the concavo-convex information.

5. The radioactive waste body inspection device of claim 4, wherein:

the dose rate inspecting unit includes a limit distance measurement detector configured to detect a distance between the collimator and the radioactive waste body; and when the detected distance becomes equal to or less than a predetermined value, the dose rate inspecting unit stops the dose rate inspection.

6. The radioactive waste body inspection device of claim 4, further comprising:

a target position calculating unit configured to calculate a target position of the second movable element in which the distance between the radiation detector and the radiation detection target position becomes substantially constant, based on the concavo-convex information; and a drive signal generating unit configured to generate a drive signal to drive the second movable element based on the target position, wherein the second movable element moves the collimator and the radiation detector based on the drive signal.

7. The radioactive waste body inspection device of claim 4, further comprising:

a coefficient rate calculating unit configured to calculate a count rate of the radiation detected by the radiation detector;

a dose rate calculating unit configured to convert the count rate into a dose rate; and a dose rate distribution calculating unit configured to calculate dose rate distribution of the radioactive waste body based on the dose rate.

8. The radioactive waste body inspection device of claim 1, further comprising an inspection table on which the radioactive waste body is placed, wherein:

the surface contamination inspecting unit conducts the surface contamination inspection in a state where the radioactive waste body is placed on the inspection table; and the dose rate inspecting unit conducts the dose rate inspection in a state where the radioactive waste body is placed on the inspection table.

9. The radioactive waste body inspection device of claim 8, wherein the surface contamination inspecting unit and the dose rate inspecting unit are installed in substantially symmetrical positions about a center of the inspection table.

10. The radioactive waste body inspection device of claim 1, wherein the dose rate inspecting unit detects a radiation from the radioactive waste body in a substantially constant distance from a surface of the radioactive waste body in consideration of the concavo-convex information even in a case where there is a concavity and convexity on the surface of the radioactive waste body.

11. A radioactive waste body inspection device comprising:

a surface contamination inspecting unit configured to conduct a surface contamination inspection of a radioactive waste body while acquiring concavo-convex information on the radioactive waste body; and a dose rate inspecting unit configured to conduct a dose rate inspection of the radioactive waste body in consideration of the concavo-convex information;

wherein the surface contamination inspecting unit includes:

a wiping material configured to wipe off a surface of the radioactive waste body;

a buffer material configured to press the wiping material against the surface of the radioactive waste body by expanding and contracting according to the surface of the radioactive waste body;

a first movable element configured to move the wiping material and the buffer material; and a wiping unit sensor configured to detect expansion and contraction information on the buffer material that is the concavo-convex information.

12. The radioactive waste body inspection device of claim 11, further comprising:

a distance calculating unit configured to calculate, based on the expansion and contraction information, a surface contamination inspection distance between a distance detector configured to move in synchronization with the first movable element and a wiping target position on the surface of the radioactive waste body; and a moving average calculating unit configured to calculate a moving average of the surface contamination inspection distance and setting the moving average as the concavo-convex information.

\* \* \* \* \*